United States Patent
Ellis et al.

(10) Patent No.: US 6,761,774 B2
(45) Date of Patent: Jul. 13, 2004

(54) COMPOSITION AND METHOD FOR THE IN SITU REMOVAL SCALE FROM A SUBSTRATE

(75) Inventors: Gary Don Ellis, Proctorville, OH (US); Matthew T. Lusher, Ona, WV (US)

(73) Assignee: BASF Corporation, Southfield, MI (US)

( * ) Notice: Subject to any disclaimer, the term of this patent is extended or adjusted under 35 U.S.C. 154(b) by 154 days.

(21) Appl. No.: 09/865,138

(22) Filed: May 24, 2001

(65) Prior Publication Data

US 2003/0004081 A1 Jan. 2, 2003

(51) Int. Cl.[7] ................................................. B08B 3/10
(52) U.S. Cl. ..................... 134/2; 134/19; 134/22.13; 134/22.17; 134/35
(58) Field of Search ................................. 510/247, 254, 510/245, 252, 477, 488; 134/2, 19, 20.1, 22.11, 22.13, 22.17, 34.35, 36, 42

(56) References Cited

U.S. PATENT DOCUMENTS

| | | | |
|---|---|---|---|
| 3,033,214 A | * 5/1962 | Ber sworth et al. | 134/13 |
| 3,308,065 A | * 3/1967 | Lesinski | 134/42 |
| 3,522,093 A | * 7/1970 | Woolman | 134/22.13 |
| 3,639,279 A | 2/1972 | Gardner et al. | 252/86 |
| 3,664,870 A | 5/1972 | Oberhofer et al. | 134/3 |
| 3,951,827 A | 4/1976 | Burroughs et al. | 252/8.55 |
| 4,171,988 A | 10/1979 | Phillips et al. | 134/22 |
| 4,279,768 A | 7/1981 | Busch | 252/189 |
| RE30,796 E | * 11/1981 | Lesinski | 134/2 |
| RE30,796 E | 11/1981 | Lesinski | 134/2 |
| 4,439,339 A | 3/1984 | Doumit | 252/80 |
| 4,442,009 A | 4/1984 | O, Leary et al. | 210/697 |
| 4,708,805 A | 11/1987 | D'Muhala | 210/698 |
| 4,913,823 A | 4/1990 | Lipinski et al. | 210/699 |
| 4,973,201 A | * 11/1990 | Paul et al. | 405/264 |
| 5,024,783 A | * 6/1991 | Busch et al. | 510/247 |
| 5,084,105 A | * 1/1992 | Morris et al. | 134/3 |
| 5,346,626 A | 9/1994 | Momozaki et al. | 210/701 |
| 5,389,139 A | 2/1995 | Carpenter et al. | 106/404 |
| 5,529,637 A | 6/1996 | Frenier | 134/3 |
| 5,603,865 A | 2/1997 | DePue et al. | 252/313.1 |
| 5,629,374 A | 5/1997 | Budde et al. | 524/549 |
| 5,679,170 A | 10/1997 | Frenier | 134/3 |
| 5,684,078 A | 11/1997 | Pfaffensch lager et al. | 524/457 |
| 5,762,821 A | * 6/1998 | Tate | 252/180 |
| 5,764,717 A | * 6/1998 | Rootham | 376/316 |
| 5,786,420 A | 7/1998 | Grandhee | 525/7 |
| 5,906,971 A | 5/1999 | Lark | 510/247 |
| 2003/0004081 A1 | * 1/2003 | Ellis et al. | 510/247 |

FOREIGN PATENT DOCUMENTS

| | | | |
|---|---|---|---|
| EP | 0299166 | 5/1988 | F28G/9/00 |
| GB | 2054548 | 7/1979 | C23F/11/12 |
| JP | 000337411 A2 | * 10/1989 | |
| JP | 01-316476 | * 12/1989 | |

OTHER PUBLICATIONS

Uhlig, H. Corrosion and Corrosion Control, an introduction to corrosion science and engineering, 1963, p. 70.*
ASTM, Published Nov. 1999, entitled Standard Practice for Cleaning, Descaling, and Passivation of Stainless Steel Parts, Equipment, and Systems[1], pp. 1–12.
English Language Abstract for CN 1130599.
English Language Abstract for CN 86105761.
English Language Abstract for JP 57015895.
English Language Abstract for JP 09314188.
English Language Abstract for JP 09314189.
English Language Abstract for JP 06320191.

* cited by examiner

Primary Examiner—Frankie L. Stinson

(57) ABSTRACT

A composition and method for the removal of scale from a substrate are disclosed. The composition and method are more specifically utilized for the in situ removal of silicate-containing scale from interior surfaces of boilers and other heat exchange equipment. The silicate-containing scale is deposited in the boilers as silicate-sulfate complexes of calcium, magnesium, aluminum, and other metal atoms that are present in water. The composition, which is circulated throughout the boiler to contact the interior surfaces, such as the boiler tubes, includes a chelating agent having at least two carboxylic acid functional groups, preferably citric acid. The composition also includes an alkali metal hydroxide basic agent. The preferred alkali metal hydroxides are either potassium or sodium hydroxide. The basic agent establishes an overall basic pH of from 7 to 14 in the composition to enable precipitation of the metal atoms from the composition after interaction with the chelating agent.

26 Claims, No Drawings

COMPOSITION AND METHOD FOR THE IN SITU REMOVAL SCALE FROM A SUBSTRATE

FIELD OF THE INVENTION

The subject invention generally relates to a composition and method for the in situ removal of scale from a substrate. More specifically, the subject invention relates to a composition and method for the in situ removal of silicate-containing scale from interior surfaces of a boiler.

BACKGROUND OF THE INVENTION

Compositions and methods for removing scale are known in the art. It is understood that steam is produced for various residential, commercial, and industrial purposes. For instance, steam is produced in a heat exchange apparatus, such as a steam boiler, to provide heat for residential, commercial, and industrial buildings. Steam is also produced to generate power for various residential, commercial, and industrial applications. In the production of steam, large quantities of water are heated to temperatures that exceed the boiling point of water. As such, minerals and salts, which are dissolved in the water, are deposited on interior surfaces of the steam boiler. These deposits are known in the art as scale.

Scale is undesirable as it decreases the thermal efficiency of the steam boiler. Scale may also possess corrosive properties that can degrade the interior surfaces of the steam boiler and shorten the useful operating life of the steam boiler. It is generally understood that there are three classifications of scale. First, there is scale, typically an iron oxide, that is generated as the steam boiler corrodes. Second, there is scale that is a phosphate, carbonate, or sulfate of either calcium or magnesium. This second classification of scale is most common. Third, there is scale that is a silicate-sulfate complex of calcium, magnesium, aluminum, and other various metals. This third classification of scale is typically the most difficult scale to remove from the interior surfaces of the steam boiler.

The conventional compositions and methods of the prior art are primarily directed at removal of the first two classifications of scale. For example, conventional compositions include acids targeted to remove phosphate, carbonate, and sulfate scale of calcium and/or magnesium. It is known throughout the art that these acid compositions are ineffective in removing the third classification of scale from the steam boilers. More specifically, these acid compositions are ineffective in removing the silicate-sulfate complexes of calcium, magnesium, aluminum, and other metals. Other conventional compositions rely exclusively on chelants, such as ethylenediaminetetraacetic acid (EDTA) and nitrilotriacetic acid (NTA), to remove the phosphate, carbonate, and sulfate-based scale. As with the acid compositions, these chelant only-based compositions are ineffective in removing the third classification of scale and even require several days to remove the other classifications of scale. Other conventional compositions rely on citric acid for the removal of scale. More specifically, these conventional compositions rely on citric acid in an overall acidic environment, i.e., at pHs<7, to remove only the first classification of scale, the iron oxide scale.

Due to the overall ineffectiveness of the above compositions in removing the silicate-sulfate complexes of calcium, magnesium, aluminum, and other metals, the many industries that utilize steam for heat, power, and other reasons, have had to resort to impractical, time-consuming, and expensive methods to prevent the deposition of this third classification of scale. These industries have even had to resort to physical removal of this scale. For example, some industries must continuously treat their water to remove the minerals and salts that form the scale from the water, or to prevent the deposition of the scale. Other industries take the steam boiler out of service for certain periods of time and employ personnel to physically remove the scale while the steam boiler is out of service.

In sum, the prior art compositions described above are characterized by one or more inadequacy. Due to the inadequacies identified in the prior art, it is desirable to provide a novel composition and method that use simple ingredients, such as citric acid in an overall basic environment established by an alkali metal hydroxides, to effectively remove silicate-containing scale from the interior surfaces of a boiler.

SUMMARY OF THE INVENTION

A composition and method for the in situ removal of scale from a substrate are disclosed. Specifically, the composition and method of the subject invention are effective in removing silicate-containing scale, formed as silicate-sulfate complexes of calcium, magnesium, aluminum, and other metals, from the interior surfaces of boilers. The substrate is exposed to the composition to remove the scale. The composition includes a chelating agent (A) and a basic agent (B). The chelating agent (A) has at least two carboxylic acid functional groups and is preferably citric acid. The basic agent (B) is an alkali metal hydroxide. More specifically, the basic agent (B) is preferably potassium hydroxide, sodium hydroxide, or a combination of the two. The chelating agent (A) is present in the composition in an overall basic environment having a pH of from 7 to 14 established by the amount of the alkali metal hydroxide.

The method of the subject invention circulates the composition to contact the substrate. The method also includes other steps, such as heating the composition, filtering the composition, and, if necessary, re-circulating the composition, to ensure sufficient removal of the silicate-containing scale from the substrate. As the composition circulates to contact the substrate, the chelating agent (A) interacts with and extracts atoms of calcium, magnesium, aluminum, and other metals from the silicate-containing scale, and the overall basic environment in the composition enables these metal atoms to precipitate out of the composition as solid particulates.

Accordingly, using simple chemical ingredients, the subject invention provides a novel composition and method including a chelating agent (A) and a basic agent (B) that establishes an overall basic environment for the chelating agent (A) to effectively remove silicate-containing scale from the interior surfaces of a boiler.

DETAILED DESCRIPTION OF THE INVENTION

The composition and method of the subject invention remove scale from a substrate. More specifically, the composition and method provide for the in situ removal of scale, preferably silicate-containing scale, that is deposited on interior surfaces of various heat exchange apparatus, such as a steam boiler, during normal operation of the apparatus. To remove scale that is deposited on the interior surfaces, the substrate is exposed, in some manner, to the composition. Preferably, the composition is circulated to contact the interior surfaces. Of course, it is to be understood that the composition and method of the subject invention can be applied to any vessel in which an aqueous liquid is handled without varying the scope of the subject invention. The silicate-containing scale that is effectively removed by the composition and method disclosed herein is more completely described as a silicate-sulfate complex of calcium, magnesium, aluminum, and other various metals. An example of such a silicate-sulfate complex is calcium silicate, $CaSiO_3$.

The composition includes a chelating agent (A) and a basic agent (B). The chelating agent (A) has at least two carboxylic acid functional groups, and the basic agent (B) establishes a pH of from 7 to 14 in the composition and is selected from the group consisting of alkali metal hydroxides. The chelating agent (A), the basic agent (B), and the significance of the basic pH are described in detail below.

The chelating agent (A) is selected from the group consisting of compounds having at least two carboxylic acid functional groups (A)(i), compounds having at least two functional groups, other than carboxylic acid functional groups, that are convertible into carboxylic acid functional groups (A)(ii), and combinations thereof. It is to be understood that, without varying the scope of the subject invention, the chelating agent (A) may also be organically or inorganically-substituted. As an example, the chelating agent (A) can include halogen substituents.

The compounds having at least two carboxylic acid functional groups (A)(i) are selected from the group consisting of dicarboxylic acids, polycarboxylic acids, and combinations thereof. Various di and polycarboxylic acids include oxalic acid, adipic acid, malonic acid, succinic acid, glutaric acid, 1,2-benzenedicarboxylic acid (phthalic acid), 1,3-benzenedicarboxylic acid, 1,4-benzenedicarboxylic acid, heptanedioic acid, citric acid, and combinations thereof. In the preferred embodiment of the subject invention, the chelating agent (A) is citric acid. Other equivalent chelating agents (A) having at least two carboxylic acid functional groups include, but are not limited to, diglycolic acid, itaconic acid, malic acid, fumaric acid, glutamic acid, tartaric acid, ethylenediaminetetraacetic acid (EDTA), nitrilotriacetic acid (NTA), ethyleneglycol-bis (beta-amino-ethyl ether)-N,N-tetraacetic acid, and combinations thereof.

The compounds having at least two functional groups, other than carboxylic acid functional groups, that are convertible into carboxylic acid functional groups (A)(ii) are selected from the group of dicarboxylic acid derivatives convertible into dicarboxylic acids by hydrolysis, polycarboxylic acid derivatives convertible into polycarboxylic acids by hydrolysis, and combinations thereof. More specifically, the dicarboxylic acid derivatives convertible into dicarboxylic acids by hydrolysis are selected from the group consisting of diacyl halides, cyclic carboxylic acid anhydrides, esters of dicarboxylic acids, dicarboxamides, and combinations thereof. As an example, phthalic anhydride, a cyclic carboxylic acid anhydride and the corresponding acid anhydride of phthalic acid, reacts with water to produce phthalic acid. Therefore, phthalic anhydride is a dicarboxylic acid derivative that is convertible into a dicarboxylic acid by hydrolysis.

The chelating agent (A) is present in the composition in an amount from 5 to 25, preferably from 10 to 20, parts by weight based on 100 parts by weight of total composition. Although not required, the chelating agent (A) is preferably in solution with water when added to the composition. A suitable solution of the chelating agent (A) in water is a 10 to 50 percent solution with water, by weight of the chelating agent (A). The most preferred solution of the chelating agent (A) in water is a 15 to 30 percent solution of the chelating agent (A) with water, by weight of the chelating agent (A).

The chelating agent (A) of the subject invention is at least a bidentate ligand. In other words, the chelating agent (A) is either a bidentate ligand or a polydentate ligand. For example, oxalic acid is a common bidentate ligand that is capable of bonding to a metal atom through two of its four oxygen atoms. Citric acid is a common polydentate ligand that is capable of bonding to a metal atom through more than two oxygen atoms. It is to be understood that the metal atom acted on by the bidentate or the polydentate ligand is either the calcium, magnesium, aluminum, or the other various metals contained within the silicate-containing scale that is removed by the subject composition.

As stated above, the basic agent (B) of the subject invention is an alkali metal (Group IA of the Periodic Table of Elements) hydroxide. That is, the basic agent (B) is a hydroxide of Li, Na, K, Rb, Cs, or Fr. In preferred embodiments of the subject invention, the basic agent (B) is selected from the group consisting of NaOH, KOH, and combinations thereof. In the presence of water, the basic agent (B) ionizes to produce hydroxide ions ($OH^-$) which establish an overall basic environment in the composition. More specifically, the basic agent (B) establishes a pH of from 7 to 14 in the composition. Preferably, the basic agent (B) establishes a pH of from 10 to 14, more preferably from 12 to 14. The basic environment in the composition encourages precipitation of the metals contained within the silicate-containing scale as described below.

The basic agent (B) is present in an amount from 5 to 35, preferably from 10 to 25, parts by weight based on 100 parts by weight of the total composition. As with the chelating agent (A), the basic agent (B) is preferably in solution with water when added to the composition. A suitable solution of the basic agent (B) in water is a 25 to 75 percent solution with water, by weight of the basic agent (B). The most preferred solution of the basic agent (B) in water is a 40 to 60 percent solution of the basic agent (B) with water, by weight of the basic agent (B).

To achieve the basic environment in the composition, the subject invention includes a molar excess of the basic agent (B) relative to the chelating agent (A). This molar excess is from 0.025 to 0.075, preferably from 0.055 to 0.065, excess moles of the basic agent (B). In terms of the aqueous solutions of the chelating agent (A) and of the basic agent (B) set forth above, the volume ratio of a 20 to 25 weight percent aqueous solution of the chelating agent (A) to a 45 to 55 weight percent aqueous solution of the basic agent (B) in the composition is from 1:4 to 4:1. In the most preferred embodiment of the subject invention, the chelating agent (A) is in a 22.5 weight percent aqueous solution, the basic agent (B) is in a 50 weight percent aqueous solution, and the volume ratio of the aqueous solution of the chelating agent (A) to the aqueous solution of the basic agent (B) is 4:1. The volume ratio of the aqueous solutions of the chelating agent (A) and of the basic agent (B) establishes a composition having a boiling temperature of from 100 to 120, preferably from 105 to 115° C.

Due to the aqueous solutions of the chelating agent (A) and the basic agent (B), the preferred composition inherently includes water. Based on 100 parts by weight of the total composition, water is present in an amount from 50 to 75 parts by weight. In the preferred embodiment, the water is present is an amount from 55 to 70 parts by weight, and in the most preferred embodiment, the water is present in an amount from 61 to 69 parts by weight.

The composition optionally includes a monodentate ligand bonding to the metal atoms through one of its atoms. If included, the preferred monodentate ligands are selected from the group consisting of carboxylic acids having from 1 to 20 carbon atoms. Examples of suitable carboxylic acids include formic acid, acetic acid, propanoic acid, butanoic acid, pentanoic acid, benzoic acid, and equivalents thereof. One example of other suitable monodentate ligands not having carboxylic acid functionality that may be included in the composition is ammonia.

The composition of the subject invention may further include at least one additive selected from the group consisting of pH indicating dyes, corrosion inhibitors, polymeric dispersants, and combinations thereof. For example, the composition may include phenolphthalein to monitor the basicity of the composition as the substrate is exposed to the composition. Phenolphthalein is generally effective between 10.0 and 8.2 pH. Examples of other suitable pH indicating dyes include, but are not limited to, tropeolin O which is generally effective between 13.0 and 11.0 pH, alizarin yellow R which is generally effective between 12.0 and 10.2 pH, thymolphthalein which is generally effective between 10.6 and 9.4 pH, and nitramine which is generally effective between 13.0 and 10.8 pH. Examples of suitable dispersants include, but are not limited to, Dispersol 1324 and Dispersol 1364 commercially available from Lombardi Water Management of Ohio. Examples of other suitable dispersants include, but are not limited to, Nalco 7362 and Nalco Transport-Plus 7104T commercially available from Nalco Chemical Company of Illinois.

As described above, the basic agent (B) produces and contributes hydroxide ions in the composition. The hydroxide ions chemically attack the silicon atoms in the silicate-containing scale to disrupt the Si—O bonds. More specifically, the hydroxide ions chemically attack the silicon atoms in the silicate-sulfate complexes of the calcium, magnesium, aluminum, and other various metals to disrupt the Si—O bonds. As a result, the metal atoms of the calcium, magnesium, aluminum, and other various metals that are complexed with the Si—O bonds are exposed. Next, the chelating agent (A), in the preferred embodiment citric acid, interacts with and is able to extract the exposed metal atoms from the scale. That is, the chelating agent (A), which is either a bi or polydentate ligand, bonds to the metal atoms. Finally, achieving the overall basic environment in the composition, via the concentration of the hydroxide ions from the basic agent (B), is desirable as basic pHs enable the metal atoms to precipitate out of the composition as solid particulates of metal hydroxides. In fact, if the hydroxide ion concentration is too low, a pH of less than 7, then the effectiveness of the composition of the subject invention is diminished and it is more difficult for the metal atoms to be precipitated out of the composition. After precipitation, the solid particulates of the metal hydroxides, calcium hydroxide, magnesium hydroxide, aluminum hydroxide, and other metal hydroxides, can then be filtered from the composition. Filtering of the composition is described below.

The method disclosed in the subject invention uses the composition set forth above to remove the scale from the substrate. This method is most effective in removing silicate-containing scale previously deposited on the interior surfaces of the boiler. In this method, a first volume of the composition is circulated to contact the substrate. In terms of the steam boiler, the first volume of the composition is first charged into the boiler, and then the first volume is circulated throughout the boiler to contact the various internal surfaces of the boiler. The composition is preferably heated to from 50 to 110° C. to increase effectiveness in removing the scale. More preferably, the composition is heated to from 90 to 105° C. It is also preferred that the composition is heated during circulation throughout the boiler. However, the composition may alternatively be heated by external sources prior to circulation throughout the boiler.

The composition is circulated for from 1 to 48, preferably from 20 to 30, hours. After the appropriated circulation time, the substrate is inspected to determine if the scale has been removed. If, after inspection, it is determined that there is still additional scale deposited on the substrate that requires removal, then the first volume of the composition can be re-circulated to remove this additional scale from the substrate. If necessary, this re-circulation step is preferably conducted for from 5 to 20, more preferably from 9 to 15, hours, to remove the additional scale. Next, the first volume of the composition is filtered to eliminate the solid particulates of the metal hydroxides. After the first volume has been filtered, the first volume is preferably supplemented with additional basic agent (B).

Alternatively, if it is determined that there is still additional scale deposited on the substrate, then a 'fresh' or second volume of the composition may be charged into the boiler and then re-circulated to remove this additional scale. As with the first volume of the composition, the second volume of the composition may be filtered to remove the solid particulates of the metal hydroxides if subsequent re-circulation is necessary.

After circulation of the composition and after an adequate inspection has determined that the scale has been removed, then certain steps are take to prepare the substrate for a return-to-service, i.e., normal operation. The substrate is rinsed with water. Next, the substrate is also passivated as is known in the art to further prepare the substrate for the return-to-service. Passivation of the substrate prevents subsequent degradation of the substrate by corrosion. A passivating solution, comprising hydrochloric acid and sodium nitrate, is circulated to contact the substrate. More specifically, the passivating solution comprises 1 weight percent HCl in water and 1 weight percent sodium nitrite, $NaNO_2$, in water and is preferably circulated for from 1 to 8 hours. In the preferred embodiment where the substrate that is treated is the steam boiler, the passivating solution is circulated throughout the boiler to contact the various internal surfaces of the boiler.

The following examples illustrating the formation of the composition according to the subject invention and illustrating certain properties and results of the composition, as presented herein, are intended to illustrate and not limit the invention.

EXAMPLE 1

A 25 weight percent solution of citric acid was prepared by combining 75 parts of water and 25 parts of technical grade citric acid, the chelating agent (A), and stirring until dissolved. A 50 weight percent solution of sodium hydroxide was prepared by combining 50 parts of technical grade sodium hydroxide, the basic agent (B), and 50 parts of water and stirring until dissolved. The composition was then prepared by combining 80 parts, by volume, of the citric acid solution and 20 parts, by volume, of the sodium hydroxide solution. The composition was then heated to 100° C., and a first volume of the composition was circulated through the boiler for twenty-four hours.

After one to two hours, the circulating composition became opaque with solid particulates. These solid particulates were dissolved from the silicate-containing scale and then re-precipitated by the hydroxide ions. After twenty-four hours of circulation, the composition was removed from the boiler. The boiler was then visually inspected to determine if the scale was removed. The scale was removed. The boiler was then rinsed with fresh water. Finally, the boiler was passivated by circulating a mixture of 1 weight percent hydrochloric acid and 1 weight percent sodium nitrate in the boiler for four hours.

The composition of Example 1 had a pH ∃ 12, and resulted in a 10 Rating for amount of 'attack' on and removal of the silicate-containing scale previously deposited on the interior surfaces of the substrate, i.e., the boiler. Furthermore, the composition of Example 1 did not degrade the interior surfaces of the boiler during circulation.

The Ratings for the amount of attack on scale were established by repeated visual inspection of the boiler after the composition had been circulated to determine if the silicate-containing scale had been removed by reaction between the composition and the silicate-containing scale. The Ratings range from 1 to 10, with the worst rating 1 representing that no silicate-containing scale had been removed, and with the best rating 10 representing that all silicate-containing scale had been removed.

EXAMPLE 2

A 25 weight percent solution of citric acid was prepared by combining 75 parts of water and 25 parts of technical grade citric acid, the chelating agent (A), and stirring until dissolved. A 50 weight percent solution of potassium hydroxide was prepared by combining 50 parts of technical grade potassium hydroxide, the basic agent (B), and 50 parts of water and stirring until dissolved. The composition was then prepared by combining 80 parts, by volume, of the citric acid solution and 20 parts, by volume, of the potassium hydroxide solution. The composition was then heated to 100° C., and a first volume of the composition was circulated through the boiler for twenty-four hours.

After one to two hours, the circulating composition became opaque with solid particulates. These solid particulates were dissolved from the silicate-containing scale and then re-precipitated by the hydroxide ions. After twenty-four hours of circulation, the composition was removed from the boiler. The boiler was then visually inspected to determine if the scale was removed. The scale was removed. The boiler was then rinsed with fresh water. Finally, the boiler was passivated by circulating a mixture of 1 weight percent hydrochloric acid and 1 weight percent sodium nitrate in the boiler for four hours.

The composition of Example 2 had a pH of ∃ 12, and resulted in a 10 Rating for amount of 'attack' on and removal of the silicate-containing scale previously deposited on the interior surfaces of the substrate, i.e., the boiler. Furthermore, the composition of Example 2 did not degrade the interior surfaces of the boiler during circulation.

EXAMPLE 3

A 20 weight percent solution of citric acid was prepared by combining 80 parts of water and 20 parts of technical grade citric acid, the chelating agent (A), and stirring until dissolved. The composition was then prepared by combining 100 parts, by volume, of the citric acid solution and 10 parts, by weight, of solid technical grade potassium hydroxide, the basic agent (B), and stirring until the potassium hydroxide was in solution. The composition was then heated to 100° C., and a first volume of the composition was circulated through the boiler for twenty-four hours.

After one to two hours, the circulating composition became opaque with solid particulates. These solid particulates were dissolved from the silicate-containing scale and then re-precipitated by the hydroxide ions. After twenty-four hours of circulation, the composition was removed from the boiler. The boiler was then visually inspected to determine if the scale was removed. The scale was removed. The boiler was then rinsed with fresh water. Finally, the boiler was passivated by circulating a mixture of 1 weight percent hydrochloric acid and 1 weight percent sodium nitrate in the boiler for four hours.

The composition of Example 3 had a pH of ∃ 12, and resulted in a 10 Rating for amount of 'attack' on and removal of the silicate-containing scale previously deposited on the interior surfaces of the substrate, i.e., the boiler. Furthermore, the composition of Example 3 did not degrade the interior surfaces of the boiler during circulation.

EXAMPLE 4

A 20 weight percent solution of citric acid was prepared by combining 80 parts of water and 20 parts of technical grade citric acid, the chelating agent (A), and stirring until dissolved. The composition was then prepared by combining 100 parts, by volume, of the citric acid solution and 10 parts, by weight, of solid technical grade sodium hydroxide, the basic agent (B), and stirring until the sodium hydroxide was in solution. The composition was then heated to 100° C., and a first volume of the composition was circulated through the boiler for twenty-four hours.

After one to two hours, the circulating composition became opaque with solid particulates. These solid particulates were dissolved from the silicate-containing scale and then re-precipitated by the hydroxide ions. After twenty-four hours of circulation, the composition was removed from the boiler. The boiler was then visually inspected to determine if the scale was removed. The scale was removed. The boiler was then rinsed with fresh water. Finally, the boiler was passivated by circulating a mixture of 1 weight percent hydrochloric acid and 1 weight percent sodium nitrate in the boiler for four hours.

The composition of Example 4 had a pH of ∃ 12, and resulted in a 10 Rating for amount of 'attack' on and removal of the silicate-containing scale previously deposited on the interior surfaces of the substrate, i.e., the boiler. Furthermore, the composition of Example 4 did not degrade the interior surfaces of the boiler during circulation.

EXAMPLE 5

A 20 weight percent solution of citric acid was prepared by combining 80 parts of water and 20 parts of technical grade citric acid, the chelating agent (A), and stirring until dissolved. The composition was then prepared by combining 100 parts, by volume, of the citric acid solution and 20 parts, by weight, of solid technical grade sodium hydroxide, the basic agent (B), and stirring until the sodium hydroxide was in solution. The composition was then heated to 100° C., and a first volume of the composition was circulated through the boiler for twenty-four hours.

After one to two hours, the circulating composition became opaque with solid particulates. These solid particulates were dissolved from the silicate-containing scale and then re-precipitated by the hydroxide ions. After twenty-four hours of circulation, the composition was removed from the boiler. The boiler was then visually inspected to determine if the scale was removed. The scale was almost all removed. However, it was determined that additional circulation was needed. As such, a second volume or 'fresh' volume of the composition was heated to 100° C., and the second volume of the composition was circulated through the boiler for an additional twelve hours. The boiler was then visually inspected again to if the scale was removed. The scale was all removed. The boiler was then rinsed with fresh water. Finally, the boiler was passivated by circulating a mixture of 1 weight percent hydrochloric acid and 1 weight percent sodium nitrate in the boiler for four hours.

The composition of Example 5 had a pH of ∃ 12, and resulted in a 10 Rating for amount of 'attack' on and removal of the silicate-containing scale previously deposited on the interior surfaces of the substrate, i.e., the boiler. Furthermore, the composition of Example 5 did not degrade the interior surfaces of the boiler during circulation.

EXAMPLE 6

A 20 weight percent solution of citric acid was prepared by combining 80 parts of water and 20 parts of technical grade citric acid, the chelating agent (A), and stirring until dissolved. The composition was then prepared by combining 100 parts, by volume, of the citric acid solution and 10 parts, by weight, of solid technical grade sodium hydroxide, the basic agent (B), and stirring until the sodium hydroxide was in solution. The composition was then heated to 100° C. and circulated through the boiler for twenty-four hours.

After one to two hours, the circulating composition became opaque with solid particulates. These solid particulates were dissolved from the silicate-containing scale and then re-precipitated by the hydroxide ions. After twenty-four hours of circulation, the composition was removed from the boiler. The boiler was then visually inspected to determine if the scale was removed. The scale was almost all removed. However, it was determined that additional circulation was needed. As such, the first volume of the composition was filtered to eliminate any solid particulates in the first volume. After filtering, the first volume of the composition was supplemented with an additional 10 parts, by weight, of the solid technical grade sodium hydroxide to ensure the basic environment. After supplementing, the 'refreshed' first volume was heated to 100° C. and then was re-circulated through the boiler for an additional twelve hours. The boiler was then visually inspected again to if the scale was removed. The scale was all removed. The boiler was then rinsed with fresh water. Finally, the boiler was passivated by circulating a mixture of 1 weight percent hydrochloric acid and 1 weight percent sodium nitrate in the boiler for four hours.

The composition of Example 6 had a pH of ∃ 12, and resulted in a 10 Rating for amount of 'attack' on and removal of the silicate-containing scale previously deposited on the interior surfaces of the substrate, i.e., the boiler. Furthermore, the composition of Example 6 did not degrade the interior surfaces of the boiler during circulation.

COMPARATIVE EXAMPLES

The several comparative examples detailed in the following table were prepared by adding the composition parts by weight, unless otherwise indicated. Only the non-aqueous parts of the comparative examples are detailed. That is, in all cases, the remainder of the composition for the comparative examples is water, by weight. Examples 7 and 8 (listed in the table as Comparative Examples 19 and 20, respectively), detailing compositions according to the subject invention, are included in the table for comparative purposes. Examples 7 and 8 were prepared as described above in Example 1.

| Comp. Example No. | Composition | Result |
|---|---|---|
| 1 | 32% hydrochloric acid | No attack on silicate-containing scale. Degrades interior surfaces of boiler. Rating = 1 |
| 2 | 100% acetic acid | No attack on silicate-containing scale. Degrades interior surfaces of boiler. Rating = 1 |
| 3 | 35% acetic acid | No attack on silicate-containing scale. Degrades interior surfaces of boiler. Rating = 1 |
| 4 | 98% sulfuric acid | No attack on silicate-containing scale. Degrades interior surfaces of boiler. Rating = 1 |
| 5 | 33% sulfuric acid | No attack on silicate-containing scale. Degrades interior surfaces of boiler. Rating = 1 |
| 6 | 85% phosphoric acid | No attack on silicate-containing scale. Degrades interior surfaces of boiler. Rating = 1 |
| 7 | 35% phosphoric acid | No attack on silicate-containing scale. Degrades interior surfaces of boiler. Rating = 1 |
| 8 | 70% nitric acid | No attack on silicate-containing scale. Degrades interior surfaces of boiler. Rating = 1 |
| 9 | 35% nitric acid | No attack on silicate-containing scale. Degrades interior surfaces of boiler. Rating = 1 |
| 10 | 35% nitric acid/16% hydrochloric acid | No attack on silicate-containing scale. |

-continued

| Comp. Example No. | Composition | Result |
|---|---|---|
| 11 | 10% hydrofluoric acid | Degrades interior surfaces of boiler. Rating = 1 No attack on silicate-containing scale. |
| 12 | 32% hydrochloric acid/10% ammonium fluoride | Degrades interior surfaces of boiler. Rating = 1 No attack on silicate-containing scale. |
| 13 | 10% acetic acid/8% EDTA | Degrades interior surfaces of boiler. Rating = 1 No reaction. |
| 14 | 20% acetic acid/20% citric acid | Rating = 1 No reaction. |
| 15 | 5% sodium silicate | Rating = 1 No reaction. |
| 16 | 10% EDTA | Rating = 1 No reaction. |
| 17 | 10% sodium hydroxide/8% sodium borate | Rating = 1 No reaction. |
| 18 | 50% sodium hydroxide | Rating = 1 Minor attack, i.e., reaction, on silicate-containing scale. Rating = 3 |
| Example 7 | | |
| 19 | 10% sodium hydroxide/8% EDTA | Almost all silicate-containing scale removed. Rating = 8 |
| Example 8 | | |
| 20 | 20% sodium hydroxide/20% citric acid | All silicate-containing scale removed. Rating = 10 |

The results included in the above table indicate that Comparative Examples 1–18 did not successfully remove the silicate-containing scale from the substrate. In fact, in most instances, the comparative example compositions actually degraded the interior surfaces of the boiler substrate. On the other hand, Comparative Example 19, having a Rating of 8, removed almost all silicate-containing scale, and Comparative Example 20, having a Rating 10, removed all of the silicate-containing scale from the substrate.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of removing scale from a substrate, said method characterized by using a composition comprising
   (A) a chelating agent having at least two carboxylic acid functional groups; and
   (B) a basic agent selected from the group consisting of alkali metal hydroxides, said basic agent establishing a pH of from 7 to 14 in said composition
   to remove the scale from the substrate; wherein one of:
   i. the composition consists of a) at least one of citric acid and a derivative of citric acid that can be converted to citric acid by hydrolysis, b) the basic agent, and c) optionally, water; or
   ii. the chelating agent is at least one of adipic acid, malonic acid, succinic acid, 1,2-benzenedicarboxylic acid, 1,3-benzenedicarboxylic acid, 1,4-benzenedicarboxylic acid, heptanedioic acid, itaconic acid, fumaric acid, glutamic acid, tartaric acid, ethyleneglycol-bis(beta-aminoethyl ether)-N,N-tetraacetic acid, and a derivative of any of the preceding acids that can be converted to the acid by hydrolysis.

2. The method of claim 1, wherein the scale comprises silica scale.

3. A method for in situ removal of scale from a substrate, said method comprising the steps of:
   circulating a first volume of a composition to contact the substrate to remove scale, the composition comprising a chelating agent having at least two carboxylic acid functional groups, and a basic agent selected from the group consisting of alkali metal hydroxides wherein the basic agent establishes a pH of from 7 to 14 in the composition; wherein one of:
   i. the composition consists of a) at least one of citric acid and a derivative of citric acid that can be converted to citric acid by hydrolysis, b) the basic agent, and c) optionally, water; or
   ii. the chelating agent is at least one of adipic acid, malonic acid, succinic acid, 1,2-benzenedicarboxylic acid, 1,3-benzenedicarboxylic acid, 1,4-benzenedicarboxylic acid, heptanedioic acid, itaconic acid, fumaric acid, glutamic acid, tartaric acid, ethyleneglycol-bis($\beta$-aminoethyl ether)-N,N-tetraacetic acid, and a derivative of any of the preceding acids that can be converted to the acid by hydrolysis.

4. A method as set forth in claim 3 further comprising the step of heating the composition to from 50 to 110° C.

5. A method as set forth in claim 3 wherein step of circulating the first volume of the composition is conducted from 1 to 48 hours.

6. A method as set forth in claim 3 further comprising the step of inspecting the substrate after the composition has been circulated to determine if the scale has been removed.

7. A method as set forth in claim 6 further comprising the step of re-circulating the first volume of the composition after the substrate has been inspected to remove additional scale from the substrate.

8. A method as set forth in claim 7 further comprising the step of filtering the first volume of the composition to eliminate solid particulates in the first volume prior to re-circulating to remove additional scale.

9. A method as set forth in claim 8 further comprising the step of supplementing the first volume of the composition with additional basic agent after the first volume has been filtered.

10. A method as set forth in claim 6 further comprising the step of re-circulating a second volume of the composition after the substrate has been inspected to remove additional scale from the substrate.

11. A method as set forth in claim 3 further comprising the step of rinsing the substrate with water after the composition has been circulated.

12. A method as set forth in claim 11 further comprising the step of passivating the substrate after rinsing.

13. The method of claim 3, wherein the composition consists of citric acid and at least one of sodium hydroxide and potassium hydroxide.

14. The method of claim 3, wherein the basic agent (B) is selected from the group consisting of sodium hydroxide, potassium hydroxide, and combinations thereof.

15. The method of claim 3, wherein water is present in the composition in an amount from 50 to 75 parts by weight based on 100 parts by weight of total composition.

16. The method of claim 3, wherein the chelating agent (A) is present in an amount from 5 to 25 parts by weight based on 100 parts by weight of total composition.

17. The method of claim 3, wherein the basic agent (B) is present in an amount from 5 to 35 parts by weight based on 100 parts by weight of total composition.

18. The method of claim 3, wherein the chelating agent (A) is in a 10 to 50 percent solution with water, by weight of the chelating agent (A).

19. The method of claim 3, wherein the basic agent (B) is in a 25 to 75 percent solution with water, by weight of the basic agent (B).

20. The method of claim 3, wherein the basic agent (B) establishes a pH of from 10 to 14 in the composition.

21. The method of claim 3, wherein there is a molar excess of the basic agent (B) relative to the chelating agent (A).

22. The method of claim 21, wherein the molar excess is from 0.025 to 0.075 excess moles of the basic agent (B).

23. The method of claim 3, wherein a volume ratio of a 20 to 25 weight percent aqueous solution of the chelating agent (A) to a 45 to 55 weight percent aqueous solution of the basic agent (B) in the composition is from 1:4 to 4:1.

24. The method of claim 3, wherein the composition of proviso ii) further comprises at least one additive selected from the group consisting of pH indicating dyes, corrosion inhibitors, polymeric dispersants, and combinations thereof.

25. The method of claim 3, wherein the scale comprises silica scale.

26. A method for in situ removal of silicate-containing scale from a boiler, said method comprising the steps of:

circulating a composition within the boiler, the composition comprising a chelating agent having at least two carboxylic acid functional groups, and a basic agent selected from the group consisting of alkali metal hydroxides wherein the basic agent establishes a pH of from 7 to 14 in the composition, wherein the scale that is removed is silicate-containing scale previously deposited on interior surfaces of the boiler; wherein one of:

i. the composition consists of a) at least one of citric acid and a derivative of citric acid that can be converted to citric acid by hydrolysis, b) the basic agent, and c) optionally, water; or ii. the chelating agent is at least one of adipic acid, malonic acid, succinic acid, 1,2-benzenedicarboxylic acid, 1,3-benzenedicarboxylic acid, 1,4-benzenedicarboxylic acid, heptanedioic acid, diglycolic acid, itaconic acid, malic acid, fumaric acid, glutamic acid, tartaric acid, ethyleneglycol-bis($\beta$-aminoethyl ether)-N,N-tetraacetic acid, and a derivative of any of the preceding acids that can be converted to the acid by hydrolysis.

\* \* \* \* \*